US006557062B1

(12) United States Patent
Shaler et al.

(10) Patent No.: US 6,557,062 B1
(45) Date of Patent: Apr. 29, 2003

(54) SYSTEM AND METHOD FOR LOW-NOISE CONTROL OF RADIO FREQUENCY DEVICES

(75) Inventors: Barton G. Shaler, Solana Beach, CA (US); Steve Caras, Poway, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/456,685

(22) Filed: Dec. 9, 1999

(51) Int. Cl.[7] ................................................ G06F 13/00
(52) U.S. Cl. ........................ 710/110; 713/500; 370/282
(58) Field of Search ................... 710/71, 110; 713/400, 713/500, 600; 370/278, 282, 296, 310, 507, 520

(56) References Cited

U.S. PATENT DOCUMENTS 4,860,285 A * 8/1989 Miller et al. ................ 370/507
5,548,814 A * 8/1996 Lorang et al. .............. 370/310
5,687,326 A 11/1997 Robinson

* cited by examiner

*Primary Examiner*—Glenn A. Auve
(74) *Attorney, Agent, or Firm*—Antonelli, Terry, Stout & Kraus, LLP

(57) ABSTRACT

A system and method for controlling Radio Frequency (RF) devices. A serial RF control bus (106) provides a half-duplex serial communication interconnect path between a bus master (108) and one or more bus slaves (110). The bus master is coupled to a processor (102), and each bus slave is coupled to an RF device (104) that operates without a free-running clock. The processor controls the RF devices by sending and receiving messages over the RF control bus. The bus master and bus slaves format these messages for transmission across the RF control bus. The RF control bus includes a bi-directional data line (120), a first clock line (124), and a second clock line (122). The first clock line is asserted by the bus master when transmitting serial data to and receiving serial data from the RF slaves via the data line. The second clock line is asserted by the RF slaves when transmitting serial data to the bus master via the data line.

17 Claims, 13 Drawing Sheets

SYSTEM AND METHOD FOR LOW-NOISE CONTROL OF RADIO FREQUENCY DEVICES

BACKGROUND OF THE INVENTION

1. Field of the Invention

The present invention relates generally to Radio Frequency systems, and more particularly to low-noise control of Radio Frequency devices without the use of free-running clocks.

2. Related Art

In modern integrated avionics systems, digital devices such as signal processors, data processors, and controllers, are often used to control Radio Frequency (RF) devices such as receivers, transmitters, and antenna electronics. These systems are deployed in a wide variety of avionics applications, including both ground and airborne environments for military and commercial users. Digitally controlled RF devices also find use outside of avionics, such as in the telecommunications industry. For example, cellular telephone base stations often include RF devices controlled by digital hardware.

The task of controlling RF devices using digital hardware is difficult. The digital hardware must provide the necessary control without coupling digital noise into the sensitive RF circuitry. Furthermore, precise timing of execution of commands by the RF devices is critical. Yet, in order to minimize digital noise, many RF devices operate without a free-running clock. As a result, these devices have no sense of time.

A critical component of any RF control system is the bus over which commands and data are sent. Most commercially available data buses emphasize high speed and throughput or long distance runs, neither of which are required for RF control. Data busses also tend to generate more digital noise, which makes them undesirable for RF control use.

Conventional serial communications bus techniques are based on a clock pulse data scheme. These techniques may provide clock and data signals on separate lines or provide a data signal which is encoded with clock information. Alternatively, data may be transmitted asynchronously with a clock signal being generated locally by the receiver. All these techniques require that the receiver view data at the specific instant in time associated with a clock edge. None of these techniques provides RF control with sufficiently low noise to operate with highly sensitive RF devices.

A need therefore exists for an improved system and method for low-noise digital control of RF devices without the use of free-running clocks.

SUMMARY OF THE INVENTION

Briefly stated, the present invention is directed to a system and method for controlling RF devices, such as receivers, transmitters, and antenna electronics. According to the present invention, a serial RF control bus provides a half-duplex serial communication interconnect path between a bus master and one or more bus slaves. The bus master is coupled to a processor, and each bus slave is coupled to an RF device that operates without a free-running clock. The processor controls the RF devices by sending and receiving messages over the RF control bus. The bus master and bus slaves format these messages for transmission across the RF control bus. The control bus includes a data line, a first clock line, and a second clock line. The first clock line is asserted by the bus master when transmitting serial data to and receiving serial data from the RF slaves via the data line. The second clock line is asserted by the RF slaves when transmitting serial data to the bus master via the data line.

An advantage of the current invention is that low-noise control of RF devices is achieved with a minimum number of differential interconnects and without using free-running clocks, thereby minimizing a significant source of electromagnetic coupling. RF devices of increased sensitivity can be controlled as a result.

Another advantage of the current invention is that all knowledge of time is in the hands of the bus master. This provides centralized control of time of execution of all commands, and frees the bus slaves and/or RF devices from any time keeping requirements.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

Overview of the Invention

Figure 1:
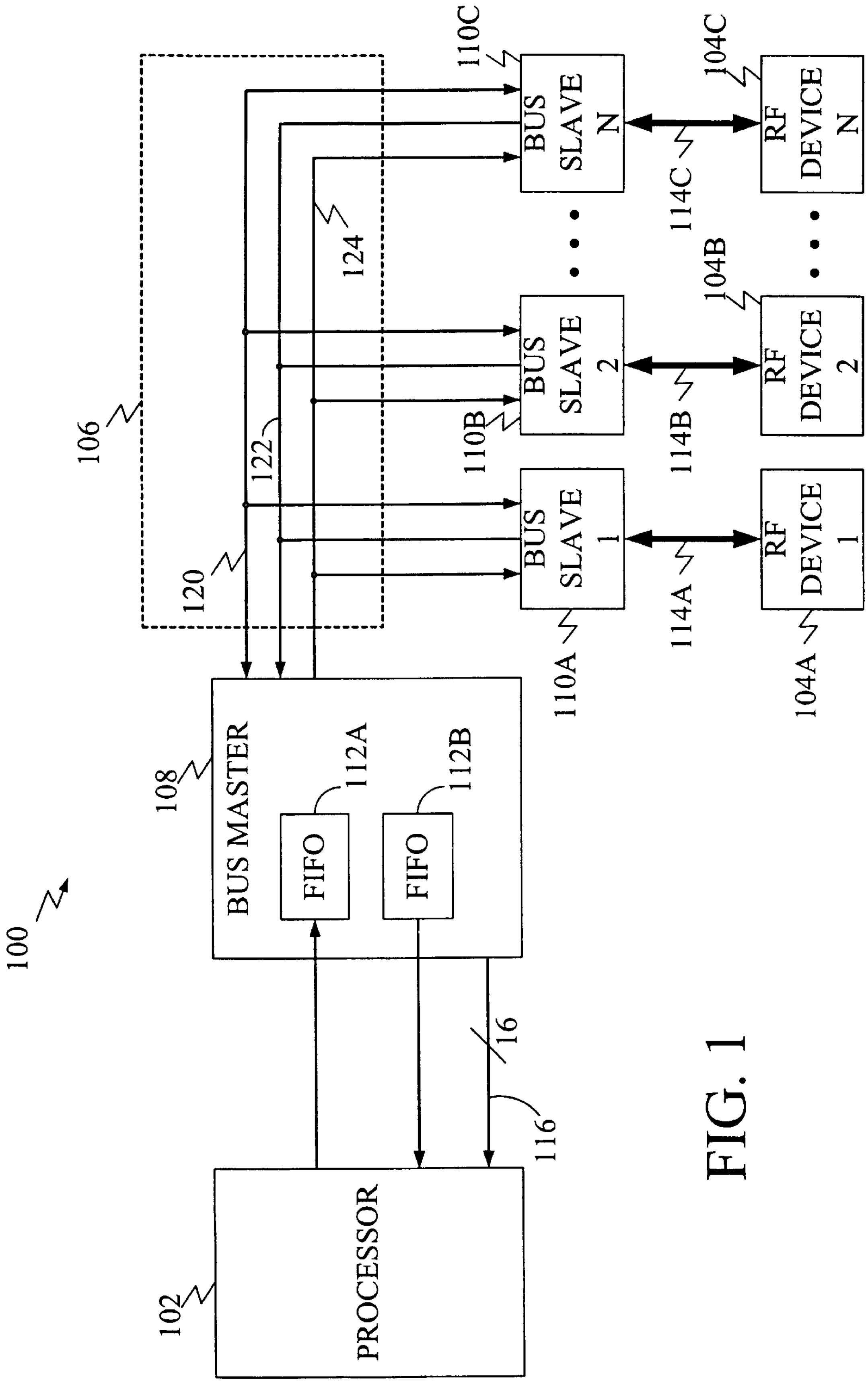
FIG. 1 depicts an RF environment within which the present invention is used.

Briefly stated, the present invention is directed to a system and method for controlling RF devices, such as receivers, transmitters, and antenna electronics. FIG. 1 depicts an RF environment 100 within which the present invention is used. A processor 102 is interconnected with one or more RF devices 104 (shown as 104A through 104C) via an RF control bus 106. A bus master 108 provides processor 102 with access to RF control bus 106. Bus master 108 includes one or more first-in/first-out (FIFO) devices 112 (shown as 112A and 112B). Processor 102 sends data to bus master 108 using FIFO 112A and receives data from bus master 108 via FIFO 112B. Processor 102 is also connected to bus master 108 via a status line 116. On the slave side, each RF device 104 is connected to RF control bus 106 via an RF interface 114 (shown as 114A through 114C) and a bus slave 110 (shown as 110A through 110C).

RF environment 100 depicts a common situation wherein a digital processor 102 controls one or more RF devices 104. According to the present invention, processor 102 communicates with RF devices 104 via RF control bus 106. Bus master 108 and bus slaves 110 convert parallel messages from processor 102 and RF devices 104 into serial format for transmission across control bus 106. RF control bus 106 provides a half-duplex serial communication interconnect path between bus master 108 and bus slaves 110. In a preferred embodiment, RF control bus 106 includes three signal paths: an RF data (RFD) line 120, a slave gated clock (SGC) line 122, and a master gated clock (MGC) line 124.

According to the present invention, several design elements contribute to minimizing digital noise coupling into the sensitive circuitry of RF devices 104. Bus master 108 provides clock signals to bus slaves 110 via RF control bus 106 when serial data is being transmitted across the bus. Commands are executed by bus slaves 110 under the control of bus master 108, placing all knowledge of time in the hands of bus master 108. This provides centralized control of time of execution of all commands within bus master 108. Bus slaves 110 and RF devices 104 are therefore freed of any time keeping requirements, and can operate without free-running clocks. Providing these clock signals only during transmissions reduces digital noise because no clock noise is generated at non-transmission times. In addition, using low voltage differential signals further minimizes noise coupling, as does serializing the data onto a single data line.

Physical Layer

The physical layer of RF environment 100 is described in this section. Processor 102 represents a computer processor configured to control RF devices 104 as described herein. Processor 102 can be implemented in many different configurations, depending upon the requirements of a particular application. For example, processor 102 can represent a microprocessor designed for a rack mount used in an integrated avionics system. RF device 104 can represent any RF device, such as receivers, transmitters, and antenna electronics.

Messages transmitted from processor 102 are loaded into bus master 108 through FIFO 112A. FIFO 112A is preferably implemented using a conventional 9-bit synchronous FIFO memory device. Similarly, messages received from RF devices 104 are read out from bus master 108 to processor 102 through FIFO 112B, which is also preferably implemented using a conventional 9-bit synchronous FIFO memory device. Other input/output (I/O) devices can alternatively be used to transfer data to and from bus master 108.

Bus master 108 controls access to RF control bus 106 as described herein. Bus master 108 converts parallel messages received from processor 102 into one or more serial formats for transmission across RF control bus 106. Several preferred serial formats are described in greater detail in the following section. Bus master 108 initiates all communication activities between itself and bus slaves 110. Bus master 108 can be implemented as hardware, software, or a combination of both. In a preferred embodiment, bus master 108 is implemented as dedicated logic that performs the operations described herein.

Bus master 108 also provides status information to processor 102 via status line 116, as described in greater detail below. In a preferred embodiment, status line 116 is implemented as a 16-bit interface.

Bus slaves 110 provide the communication interface between RF control bus 106 and RF devices 104. Bus slaves 110 decode serial data frames received from bus master 108 for which they are the intended recipient. Bus slave 110 only accesses RF control bus 106 in response to a communication from bus master 108. Bus slaves 110 can be implemented as hardware, software, or a combination of both. In a preferred embodiment, bus slaves 110 are implemented as dedicated logic that performs the functions described herein.

In a preferred embodiment, bus slave 110 contains four internal registers (not shown). Two of these registers are used to implement a logical ID table for resolving logical addresses (described in greater detail below). The third register contains two fields: an address parity error field and a data parity error field. The fourth register is a parity control register which has fields for inverting the parity or enabling parity checking. The third and fourth registers are used in conjunction with error checking which is described in greater detail below.

Bus slave 110 also preferably includes an external strobe input (not shown). The external strobe input can be provided by bus master 108, processor 102, or by another timing device (not shown). The external strobe input directs bus slave 110 to load data into RF device 104. The operation of the external strobe input is described in greater detail below.

RF devices 104 can represent any RF asset, such as transmitters, receivers, and antenna electronics. In a preferred embodiment, RF devices 104 do not have internal free-running clocks and therefore do not have an internal sense of time. RF devices 104 communicate with bus slaves 110 via an RF interface 114. RF interface 114 is preferably implemented using a 32-bit bidirectional data bus, eight register select signals, and an 8-bit status bus for reading status information from RF device 104.

RF control bus 106 provides a half-duplex serial communication interconnect path between bus master 108 and bus slaves 110. As shown in FIG. 1, RF control bus 106 includes a single bidirectional data path, RFD 120, and two clock paths, SGC 122 and MGC 124. This embodiment is referred to herein as the "3-wire" embodiment. In an alternative "4-wire" embodiment (not shown), the data path is separated into two unidirectional data lines: one data line driven by bus master 108 and the other data line driven by bus slaves 110. All signal paths in RF control bus 106 are preferably implemented as Low Voltage Differential Signal (LVDS) paths.

RFD 120 is a differential pair that connects bus master 108 to each bus slave 110. Bus master 108 asserts RFD 120 when it sends serial data, such as commands or synchronization, to one or more bus slaves 110. Similarly, each bus slave 110 asserts RFD 120 when it sends serial data, such as status messages, to bus master 108. RF control bus 106 is designed such that bus master 108 and bus slaves 110 do not access RFD 120 concurrently.

MGC 124 is a differential pair that connects bus master 108 to each bus slave 110. Bus master 108 asserts MGC 124 when it transmits serial data to or receives serial data from bus slaves 110 via RFD 120. In a preferred embodiment, the maximum frequency of MGC 124 is 120 MHz.

SGC 122 is a differential pair that connects bus master 108 to each bus slave 110. Bus slave 110 asserts SGC 122 in response to a command from bus master 108. The frequency of SGC 122 matches that of MGC 124.

Figure 2:
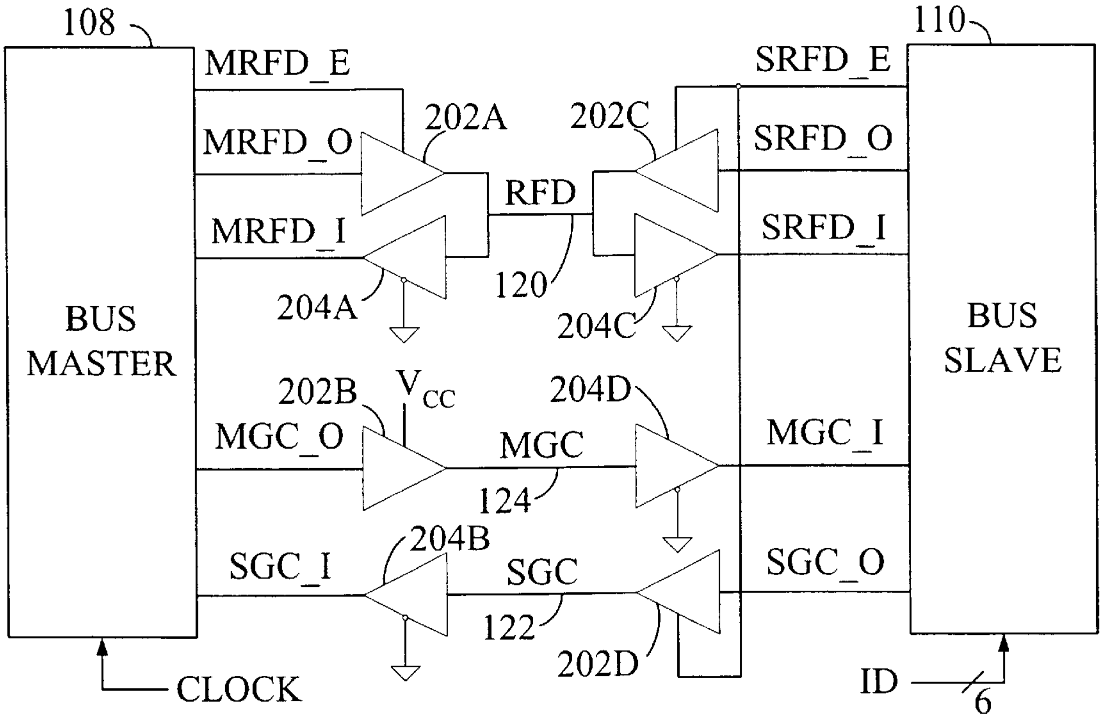
FIG. 2 depicts a 3-wire embodiment of an RF control bus according to the present invention.

FIG. 2 depicts the 3-wire embodiment of RF control bus 106 in greater detail. Bus master 108 and bus slaves 110 are coupled to RF control bus 106 using one or more LVDS drivers 202 (shown as 202A through 202D) and one or more LVDS receivers 204 (shown as 204A through 204D). A serial data output signal from bus master 108 (MRFD_O) is loaded onto RFD 120 using driver 202A, which is activated by a bus master data enable signal (MRFD_E). MRFD_0 is received at bus slave 110 using receiver 204C. The received signal is shown as SRFD_I. In the reverse direction (i.e., serial data traveling from bus slave 110 to bus master 108), the serial data output signal from bus slave 110 (SRFD_O) is loaded onto RFD 120 using driver 202C, which is activated by a bus slave data enable signal (SRFD_E). SRFD_O is received at bus master 108 using receiver 204A, shown as MRFD_I.

An output master gated clock signal (MGC_O) is loaded onto MGC 124 using driver 202B (which is always activated by the connection to the voltage source, Vcc). MGC_O is received at bus slave 110 using receiver 204D. The received signal is shown as MGC_I. Similarly, an output slave gated clock signal (SGC_O) is loaded onto SGC 122 using driver 202D (as shown, the signal SRFD_E enables both drivers 202C and 202D). SGC_O is received at bus master 108 using receiver 204B. The received signal is shown as SGC_I. The signals depicted in FIG. 2 are described in greater detail below. Receivers 204A, 204B, 204C, and 204D are always activated by the connection to ground.

As shown in FIG. 2, a clock signal is provided to bus master 108, preferably by processor 102. Bus master 108 uses this clock signal to form MGC_O. Also, an ID address is provided to bus slave 110, preferably by the corresponding RF device 104. The ID address is used to uniquely identify the corresponding RF device 104 for communications across RF control bus 106.

Returning now to FIG. 1, RF control bus 106 can be implemented as a cable (for inter-rack communications) or as a backplane (for intra-rack communications), depending upon the requirements of a particular application. The electrical characteristics of RF control bus 106 differ depending upon the embodiment.

The backplane embodiment is preferably implemented in a 3-wire configuration as shown in FIG. 2. The drivers 202 and receivers 204 are preferably implemented using the Bus LVDS (BLVDS) logic family from National Semiconductor. In this embodiment, up to 16 bus slaves 110 can be supported via RF control bus 106. The bus length of RF control bus 106 in the backplane embodiment is no longer than one meter when operating at the preferred signaling rate of 120 MHz. Stub lengths are kept to a minimum. The stub length from connector to transceiver should be limited to one-half inch. The characteristic impedance of the fully loaded bus lines, including all lumped capacitance associated with connectors and modules, is 80Ω±10%. The backplane is preferably designed to have a differential transmission line impedance of 130 Ω using stripline geometries. All bus lines are preferably terminated to reduce reflections due to characteristic impedance mismatch. Bus lines are terminated at each electrical end of the bus by an 80 Ω resistor.

Figure 3:
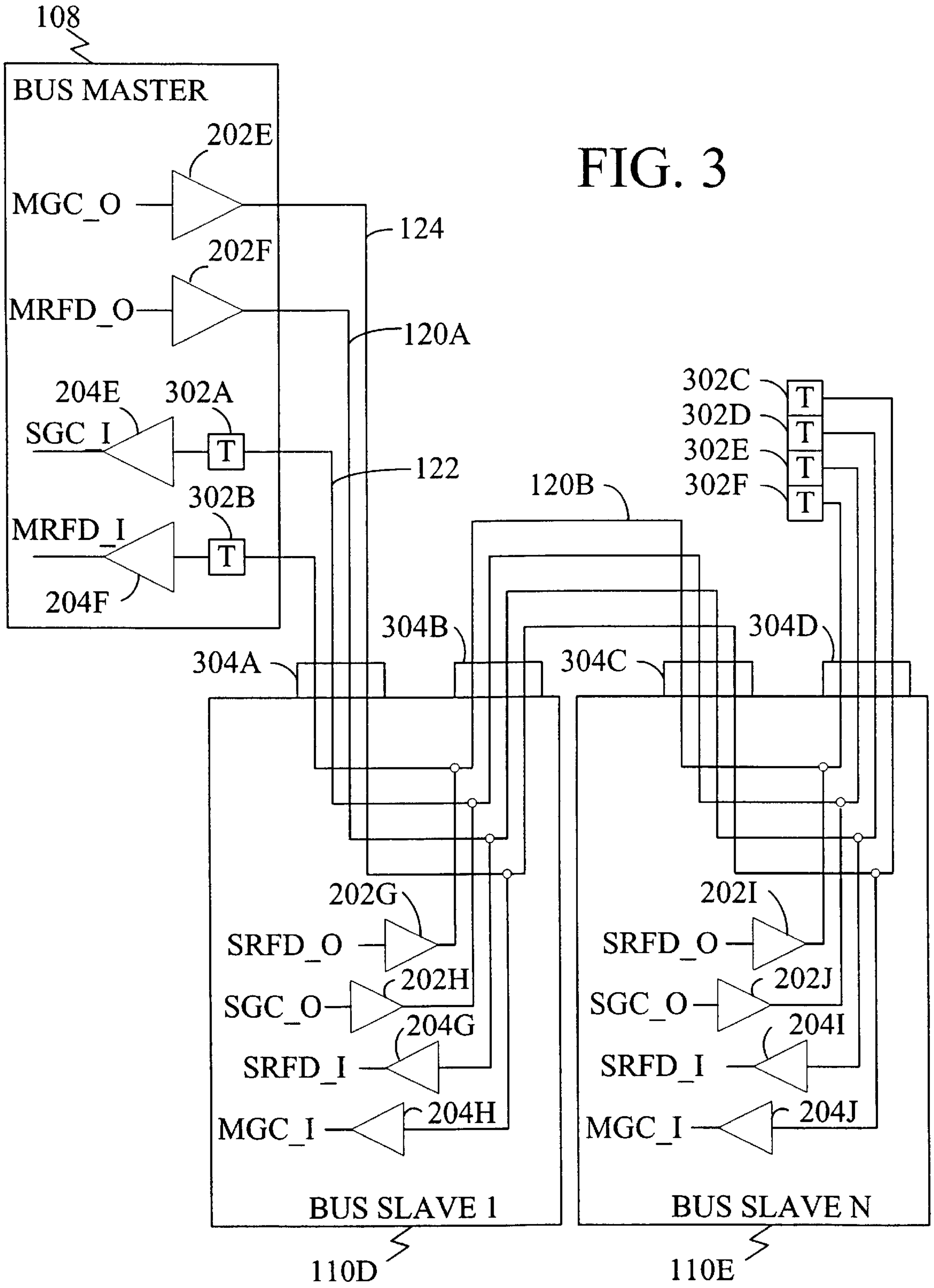
FIG. 3 depicts a cable embodiment of an RF control bus according to the present invention.

FIG. 3 depicts a preferred cable embodiment of RF control bus 106. As shown in FIG. 3, the cable embodiment is preferably implemented in a 4-wire configuration. RFD 120 is split into two unidirectional data lines, shown as 120A and 120B. The signals shown in FIG. 3 are the same as those discussed above with respect to FIG. 2. The drivers 202 (shown as 202E through 202J) are preferably implemented using standard LVDS logic. The cable embodiment of RF control bus 106 is preferably implemented using IBM Cable Type 1A 150 Ω shielded twisted pair. Those skilled in the art will recognize that other conventional cables are also available having similar properties. The cable should be no longer than five meters when operating at the preferred signaling rate of 120 MHz. In the cable embodiment, control bus 106 operates at a maximum of 120 Mbps and is able to support up to four bus slaves 110. As with the backplane embodiment of control bus 106, stub lengths are preferably kept to a minimum in the cable embodiment. The stub length from connector to transceiver should be limited to one-half inch. Further, pass-through connector pinouts (shown as 304A through 304D) are used at each bus slave 110 to allow a daisy chain configuration as shown in FIG. 3.

In the cable embodiment of RF control bus 106, all bus lines are preferably terminated to reduce reflections due to characteristic impedance mismatch. As shown in FIG. 3, a terminator 302 is used at receivers 204E and 204F in bus master 108 (shown as terminators 302A and 302B). Further, terminators 302C and 302D are used to terminate RFD 120A and MGC 124, respectively. Terminators 302E and 302F can also be used to terminate SGC 122 and RFD 120B as appropriate depending upon the particular electrical characteristics of RF control bus 106. Terminators 302 are preferably implemented as 150 Ω resistors.

In alternative cable embodiments, longer cables can be used if the data rate is reduced. In a first alternative cable embodiment, RF control bus 106 is implemented using a 20 meter cable that supports up to eight bus slaves 110 and operates at a maximum bit rate of 60 Mbps. In this embodiment, the drivers 202 and receivers 204 are preferably implemented using National Semiconductor's BLVDS differential transceivers and RF control bus 106 is implemented using TIA/EIA-485-A Category 5 twisted pair cable. In this first alternative cable embodiment, terminators 302 are preferably implemented using 100 Ω resistors.

In a second alternative cable embodiment, RF control bus 106 is implemented using a 75 meter cable that supports up to sixteen bus slaves 110 and operates at a maximum bit rate of 2.5 Mbps. In this embodiment, the drivers 202 and receivers 204 are preferably implemented using RS-485 differential transceivers and RF control bus 106 is implemented using TIA/EIA-485-A Category 5 twisted pair cable. In this second alternative cable embodiment, terminators 302 are preferably implemented using 110 Ω resistors.

Operation of the Present Invention

According to the present invention, bus master 108 converts parallel transmit messages received from processor 102 into a serial data stream, formats the serial data into a bus frame, and sends it out on RF control bus 106. Each bus slave 110 receives the bus frame, converts it to parallel form, and checks to see if the address in the message matches its own. If the address matches, bus slave 110 decodes the command, executes it, and then sends back a status byte. If the address doesn't match, bus slave 110 drops the message and waits for the next message. At the preferred 120 MHz signaling rate, one bit of serial data shall be transferred in a period of 8.33 ns.

Figure 4:
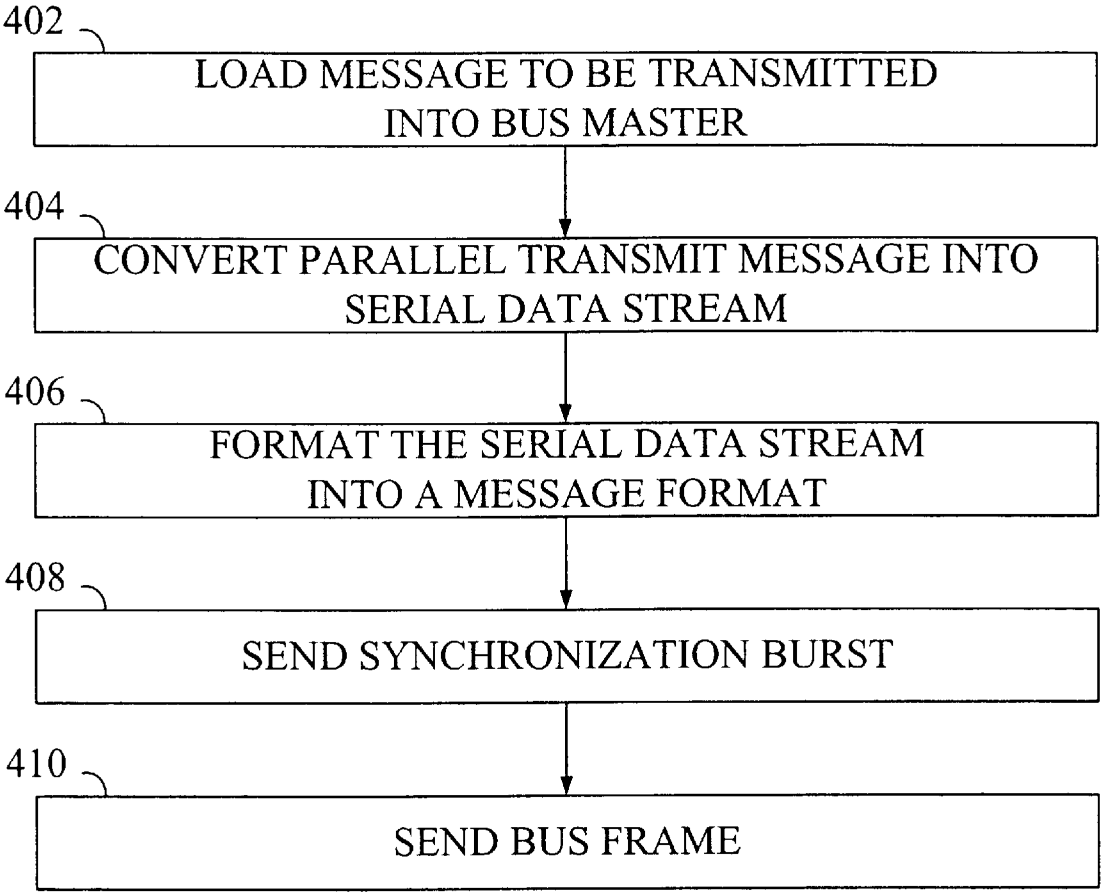
FIG. 4 depicts a flowchart that describes in greater detail the operation of the bus master when sending messages to the bus slaves.

FIG. 4 depicts a flowchart that describes in greater detail the operation of bus master 108 when sending messages to bus slaves 110. In step 402, a message to be transmitted from processor 102 to one or more bus slaves 110 is loaded into bus master 108. Processor 102 sends the message in parallel form to FIFO 112A. Bus master 108 retrieves the message from FIFO 112A when it is ready to process the message. Messages sent by processor 102 can include, for example, commands and/or data.

Formatting Messages for Transmission Over RF Control Bus

In step 404, bus master 108 converts the parallel message to a serial data stream. In step 406, bus master 108 formats the serial data stream into a serial message format for transmission across RF control bus 106. According to the present invention, three types of message formats are supported, two for bus master transmissions and one for bus slave transmissions. Bus master transmission formats include a standard message format which has a fixed length, and a variable length burst message format which has a variable length. Bus slave transmissions use an slave response message format which is described below in conjunction with the operations of bus slaves 110.

Figure 5:
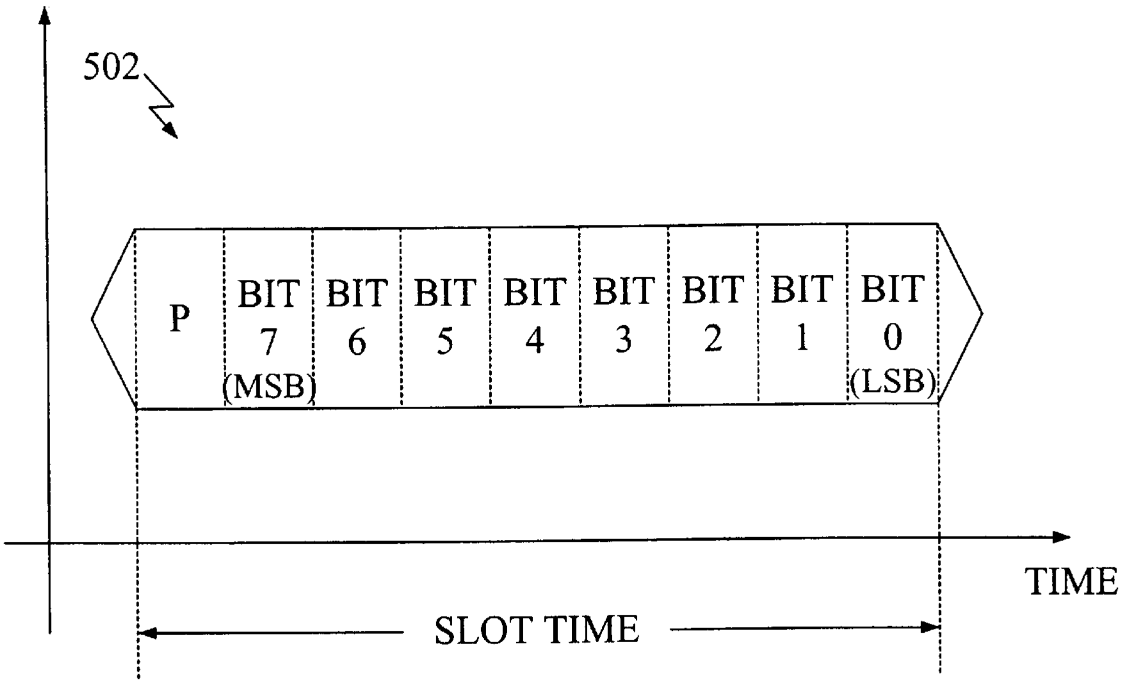
FIG. 5 depicts a bus slot.

According to the present invention, each message format is divided into one or more bus slots. FIG. 5 depicts a preferred bus slot 502 in greater detail. Bus slot 502 includes 9 bits that are transmitted over a given slot time. Every bus slot 502 includes a parity bit (labeled P) which is used for error checking (described in detail below). The other 8 data bits of each bus slot 502 vary according to the message format. Bit 7 is the most significant data bit (MSB), and bit 0 is the least significant data bit (LSB). The notation (X:Y) will be used herein to refer to bits X through Y of a particular bus slot 502.

Standard Message Format

Figure 6:
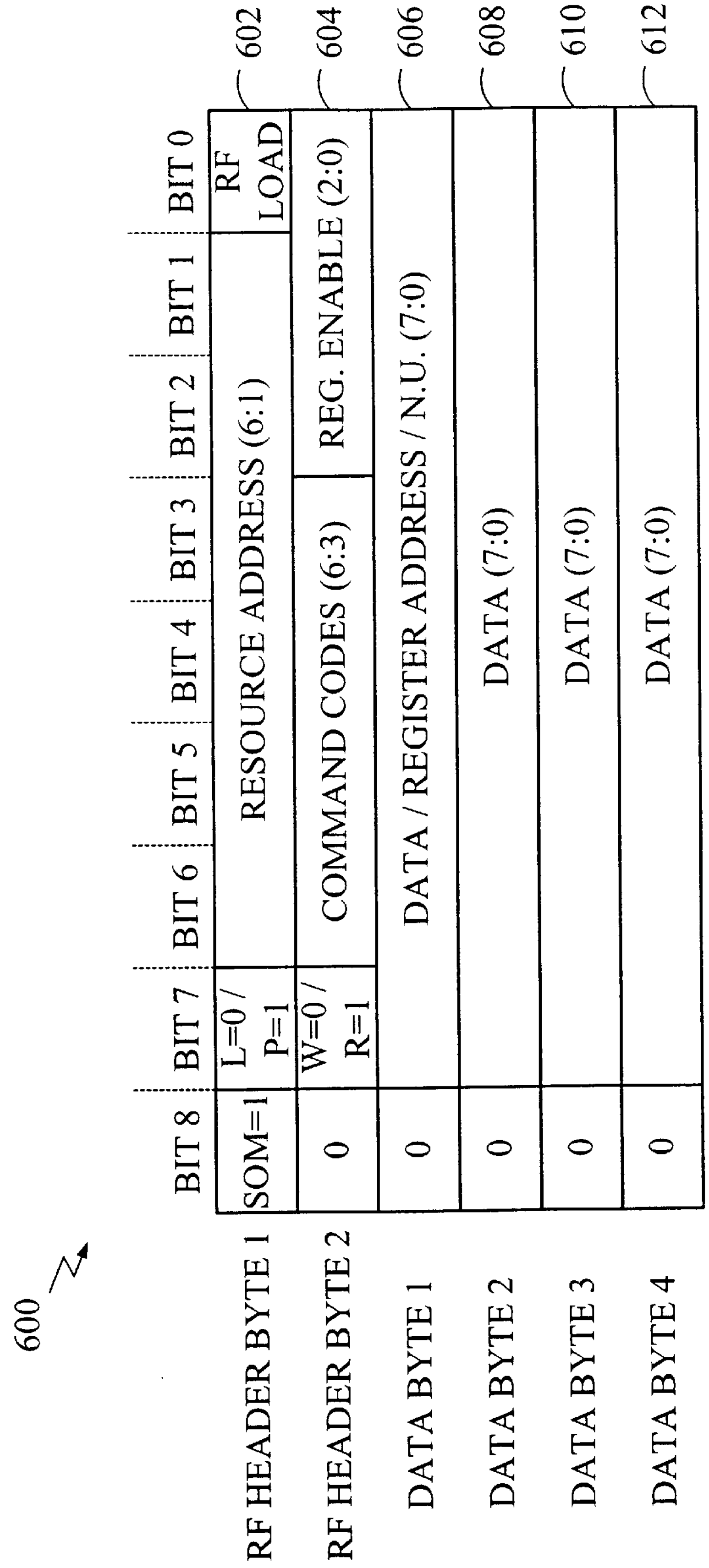
FIG. 6 depicts a standard message format.

FIG. 6 depicts a standard message format 600 in greater detail. Standard message format 600 has six bus slots (shown as 602 through 612). Bus slot 602 (labeled RF Header Byte 1) includes a start of message (SOM) bit, physical/logical address bit, a resource address, and an RF load bit. When set, the SOM bit indicates the beginning of a new message. The SOM bit is stripped from each bus slot when a message received from processor 102 is loaded into bus master 108 via FIFO 112A, and is replaced by a parity bit when sent over RF control bus 106. Resource address (6:1) indicates the one or more bus slaves 110 that are the intended recipient(s) of the message. Bus master 108 can address bus slaves 110 using physical addresses or logical addresses. The physical/logical address bit (bit 7) indicates whether the resource address (6:1) is a physical or a logical address. Physical addresses refer to the physical ID of RF device 104, while logical addresses are stored in the logical ID table within each bus slave 110. Logical addresses include one or more bits that select one of the two registers making up the logical ID table, and one or more bits that decode the bit positions in the registers.

The RF load bit (bit 0) is used in conjunction with bus write commands to load data onto RF interface 114 in response to the external strobe input to bus slave 110. If the RF load bit is not set, then the data associated with a write command is only written to RF interface 114 once the external strobe input is received. Otherwise, the data associated with a write command is written to RF interface 114 once it is received by bus slave 110. The RF load bit can be used in conjunction with the external strobe input to write data to two or more RF devices 104 at the same instant in time. This is accomplished by loading the write data into the appropriate bus slaves 110 using consecutive write commands via RF control bus 106. An external strobe input is then supplied simultaneously to each bus slave 110, causing the data to be written from each bus slave 110 to the respective RF device.

Bus slot 604 (labeled RF Header Byte 2) includes a read/write indicator bit (bit 7), a 4-bit command code (6:3), and a 3-bit register enable (2:0). The read/write indicator bit indicates whether the data in bus slots 606 through 612 is to be written to the addressed RF device 104, or whether data is to be read from the addressed RF device 104 in response to a read command.

The command code indicates to the addressed bus slave(s) 110 and RF device(s) 104 what function is to be performed. In a preferred embodiment, a hexadecimal code is used to uniquely identify a command from one or more available commands. Various commands are preferably defined for writing and reading data. Example write commands can include an RF device/bus slave reset command, a data transfer command for transferring a word of data, a burst transfer command for transferring multiple words of data, an RF interface load command that causes an RF interface 114 to load data previously programmed into the RF interface holding registers, and commands for writing to the internal registers of bus slave 110. Example read commands can include a status request command for polling the status of an addressed bus slave 110, a read command that causes an addressed bus slave 110 to output data to bus master 108, and commands for reading from the internal registers of bus slave 110.

The register enable indicates to the addressed bus slaves 110 which register select signals within RF interface 114 are to be activated for those read or write commands that affect RF interface 114. The register enable bits are treated as "don't care" for those commands that do not involve RF interface 114.

Bus slots 606 through 612 (labeled Data Byte 1 through Data Byte 4) contain the data that is to be transferred to the addressed bus slave 110 for write commands (as indicated by the read/write indicator bit in bus slot 604). Further, in a preferred embodiment, bus slot 606 can contain a register address, data, or is not used (N.U.) depending on the command. Bus Slots 608 through 612 are not sent if a bus read command is being executed.

Variable Length Message Format

Figure 7:
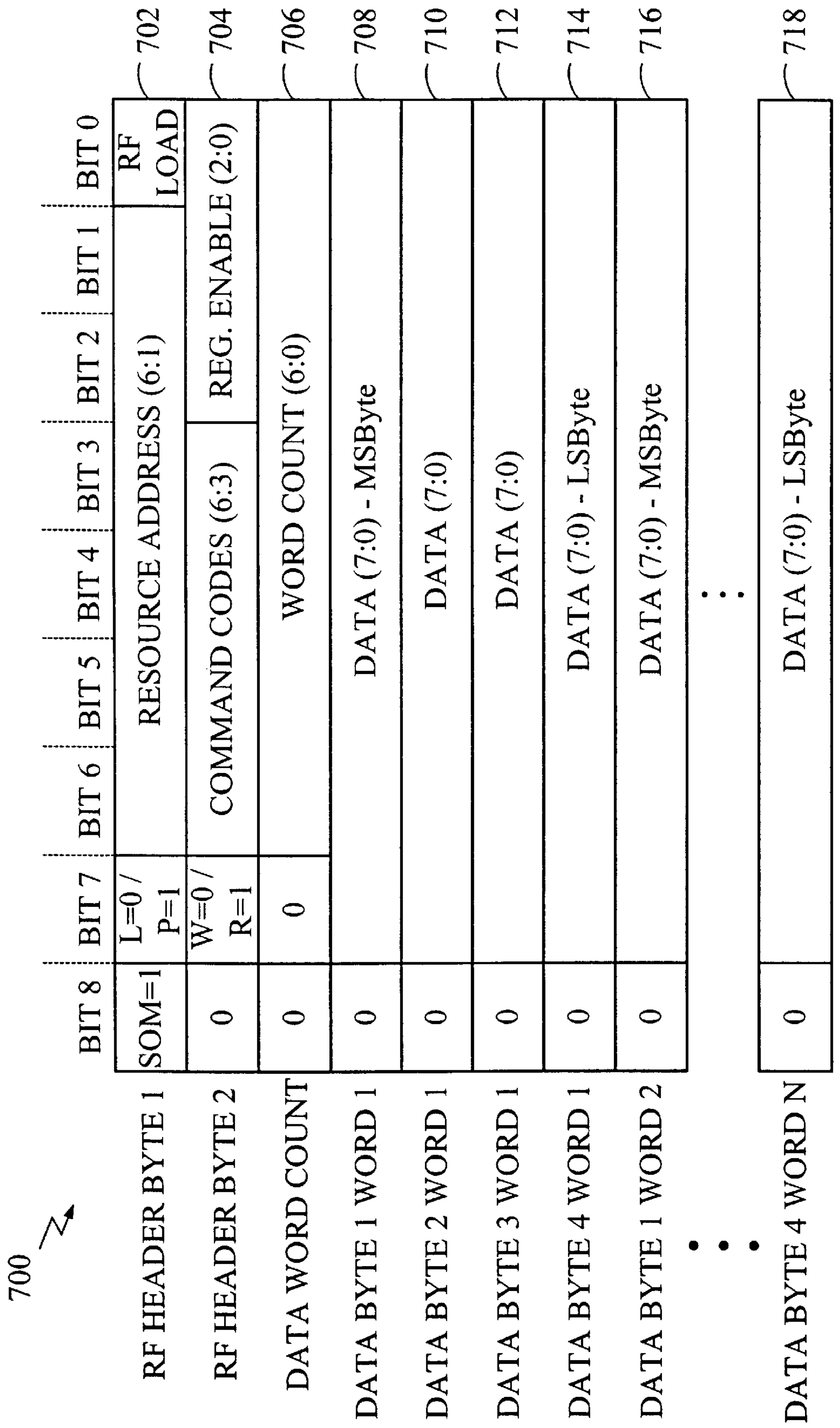
FIG. 7 depicts a variable length message format.

FIG. 7 depicts a variable length message format 700 in greater detail. Variable length message format 700 has a variable number of bus slots (shown as 702 through 718). Bus slots 702 and 704 contain the same fields as described above with respect to bus slots 602 and 604. Bus slot 706 (labeled Data Word Count) includes a word count (6:0) that indicates the number of data words that follow, beginning with bus slot 708 and ending with bus slot 718. As shown in FIG. 7, each data word has four bytes which are ordered in consecutive bus slots. For example, bus slot 708 contains the first byte of the first word of data, bus slot 710 contains the second byte of the first word of data, and so on through bus slot 718 which contains the fourth byte of the final word of data (N words as shown in FIG. 7).

Sending Synchronization Burst Over RF Control Bus

Returning now to FIG. 4, once bus master 108 has formatted the message received from processor 102 in step 406, bus master 108 sends a synchronization burst across RF control bus 106 in step 408 indicating that a bus frame is starting.

Figure 8:
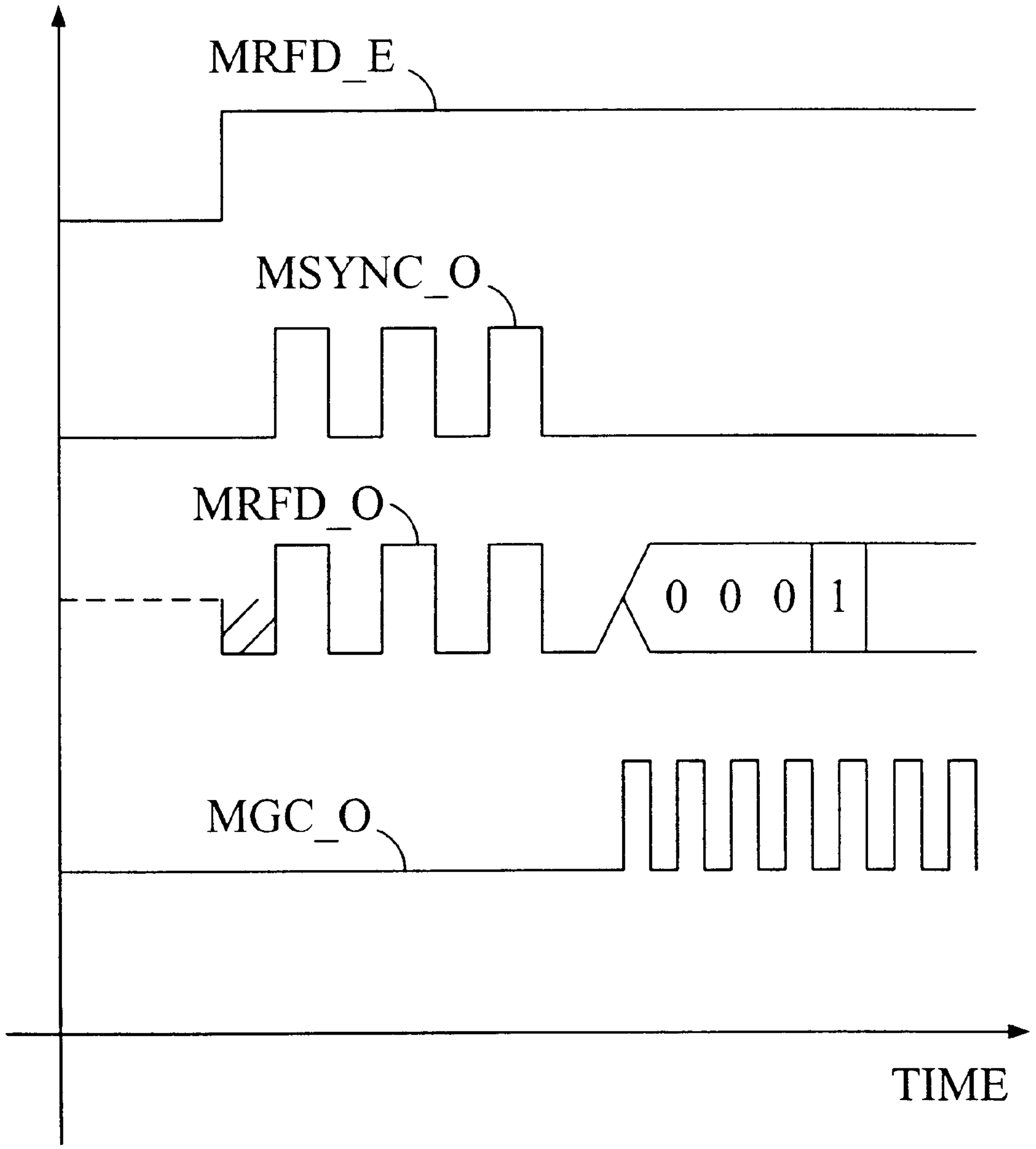
FIG. 8 depicts a synchronization burst.

FIG. 8 depicts this synchronization burst in greater detail. In a preferred embodiment, bus master 108 sends the MSYNC_O signal on RFD 120 without a clock signal being sent on MGC 124. As shown, MSYNC_O includes a four cycle clock burst. This is followed by message data that begins with a 4-bit period data synchronization pattern consisting of 0,0,0,1. The resulting signal over RFD 120 is shown as MRFD_O. The data synchronization pattern can contain additional leading zeros to allow for bus driver turn on time. This data synchronization pattern precedes every message transmitted over RF control bus 106.

Sending a Bus Frame Over RF Control Bus

Returning again to FIG. 4, once the synchronization burst has been sent in step 408, bus master 108 sends a bus frame across RF control bus 106 in step 410 that includes the formatted message generated in step 406. According to the present invention, different bus frames are used depending upon the format of the underlying message. Standard format messages are sent using a standard message bus frame. Variable length format messages are sent using a variable length bus frame.

Standard Message Bus Frame

Figure 9:
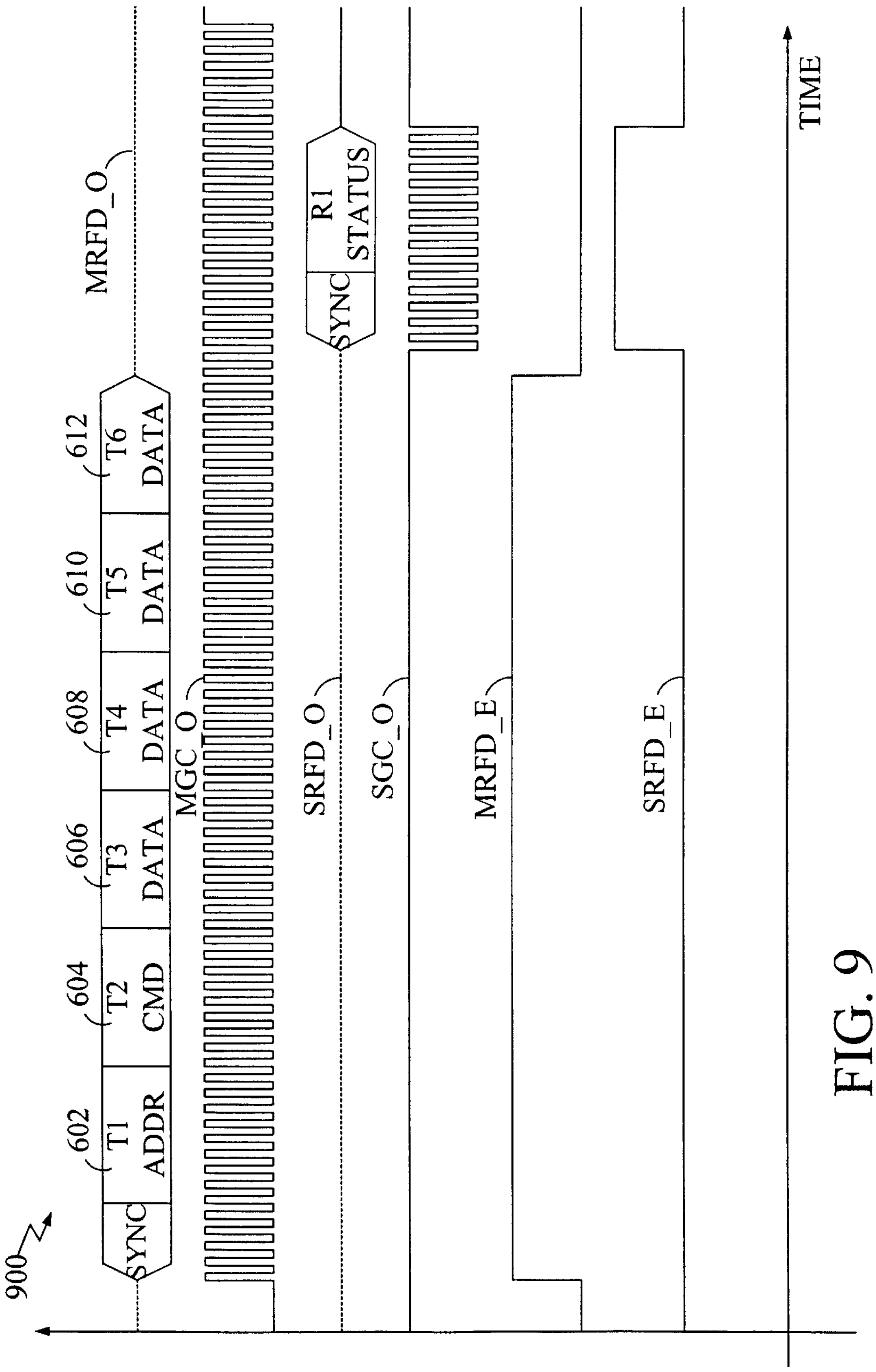
FIG. 9 depicts a standard message bus frame.

FIG. 9 depicts a standard message bus frame 900 in greater detail. Bus master 108 sends the data signal MRFD_O over RFD 120 by enabling the appropriate driver 202 (e.g., driver 202A or 202F) with the enable signal MRFD_E. MRFD_O includes the data synchronization pattern (labeled SYNC), followed by the message formatted according to standard message format 600, including bus slots 602 through 612.

The addressed bus slave 110 responds in a manner dictated by the message. If the message requires a response from the addressed bus slave 110, then bus slave 110 responds with a data signal SRFD_O over RFD 120 by enabling the appropriate driver 202 (e.g., driver 202C or 202G) with the enable signal SRFD_E. The form of data signal SRFD_O varies according to the message. For example, as shown in FIG. 9, the addressed bus slave 110 preferably responds to a physically addressed write command with a status message. In this example, SRFD_O includes the data synchronization pattern (labeled SYNC), followed by a one-byte status message. As another example, the addressed bus slave 110 preferably responds to a read command with a message formatted in a received data message format described below. As still another example, the addressed bus slave 110 preferably does not respond at all when the transmitted message is logically addressed. In a preferred embodiment, the addressed bus slave 110 responds to a message with an approximate 4 cycle bus transition period.

Bus master 108 activates the master gated clock signal MGC_O over MGC 124 during the transmission of MRFD_O, and during the bus slave's response, SRFD_O. Bus slave 110 activates the slave gated clock signal SGC_O over SGC 122 only during the transmission of SRFD_O.

Standard message bus frame 900 lasts approximately 700 nS in duration, and can therefore achieve an effective transfer rate of approximately 1.4 MWPS at the preferred signaling rate of 120 MHz. The maximum effective information word size is 32 bits.

Variable Length Bus Frame

Figure 10:
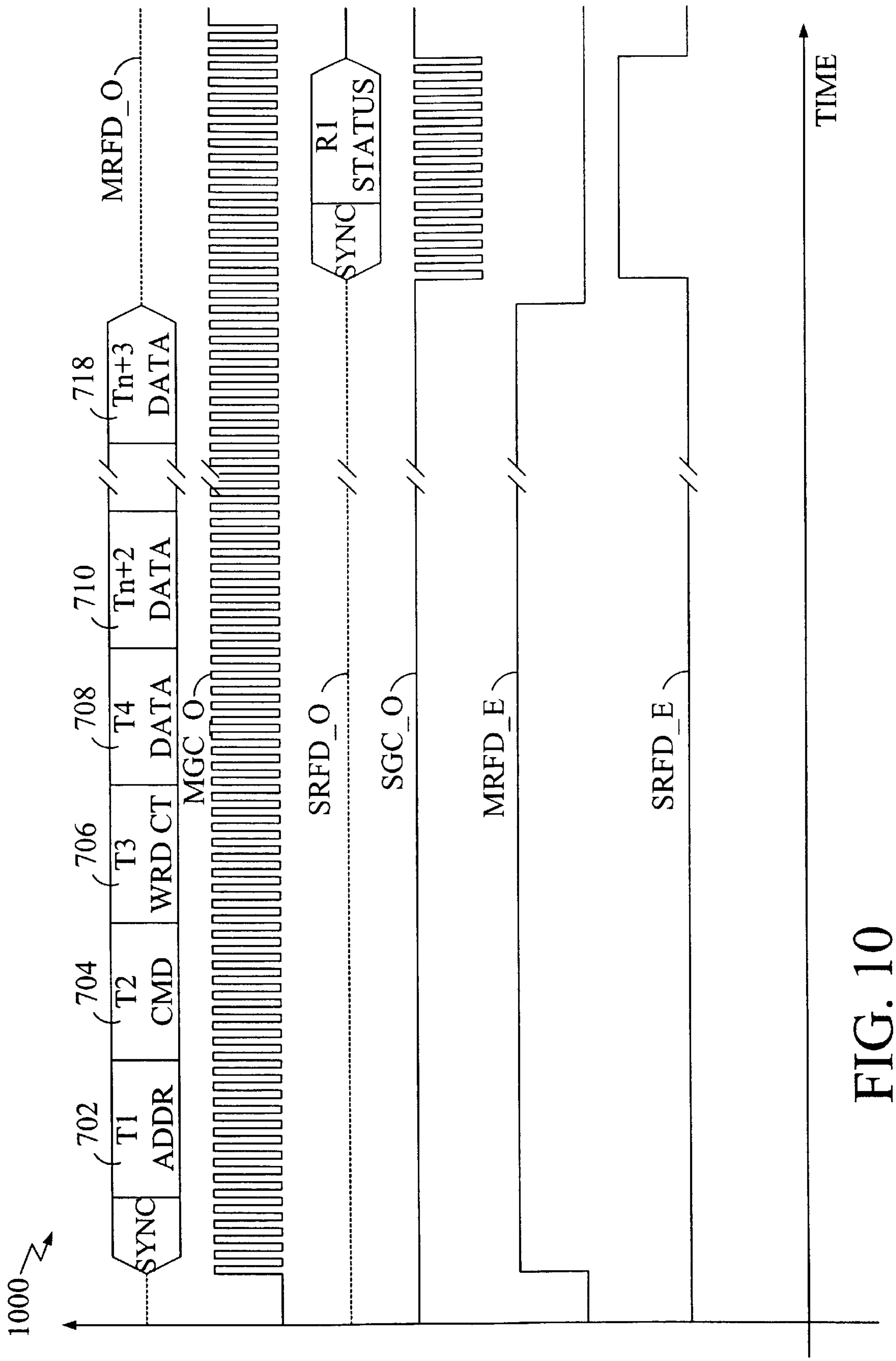
FIG. 10 depicts a variable length bus frame.

FIG. 10 depicts a variable length bus frame 1000 in greater detail. Bus master 108 sends the data signal MRFD_O over RFD 120 by enabling the appropriate driver 202 (e.g., driver 202A or 202F) with the enable signal MRFD_E. MRFD_O includes the data synchronization pattern (labeled SYNC), followed by the message formatted according to variable length message format 700, including bus slots 702 through 718. The addressed bus slave 110 responds in a manner dictated by the message, as described above with respect to standard message bus frame 900.

In a preferred embodiment, the transmission of data words in variable length bus frame 1000 is controlled by an external control signal on bus master 108 (not shown). When high, this external control signal allows data words to be sent to the addressed bus slave 108. When the external control signal is low, data and clock transmission will be stopped at a word boundary until the external control signal goes high again.

Bus master 108 activates the master gated clock signal MGC_O on MGC 124 during the transmission of MRFD_O, and during the bus slave's response, SRFD_O. Bus slave 110 activates the slave gated clock signal SGC_O on SGC 122 only during the transmission of SRFD_O.

Variable length bus frame 1000 can achieve an effective transfer rate of approximately 3.3 MWPS. The information word size is 32 bits (four bytes) and between 1 and 127 words can be transferred in a single burst message.

Bus Slave Operations in Response to Received Bus Frame

Returning again to FIG. 4, in step 410 bus master 102 sends a bus frame over RF control bus 106 to the one or more bus slaves 110. As mentioned above, each bus slave 110 receives the bus frame, converts it to parallel form, and checks to see if the address in the message matches its own. If the address matches, bus slave 110 decodes the command and executes it. If the address doesn't match, bus slave 110 drops the message and wait for the next message. As described above, the addressed bus slave 110 responds in a manner dictated by the message. As shown in FIG. 9, the addressed bus slave 110 preferably responds to a physically addressed write command with a one-byte status message, responds to a read command with a message formatted in a received data message format described below, and does not respond at all when the transmitted message is logically addressed.

Figure 11:
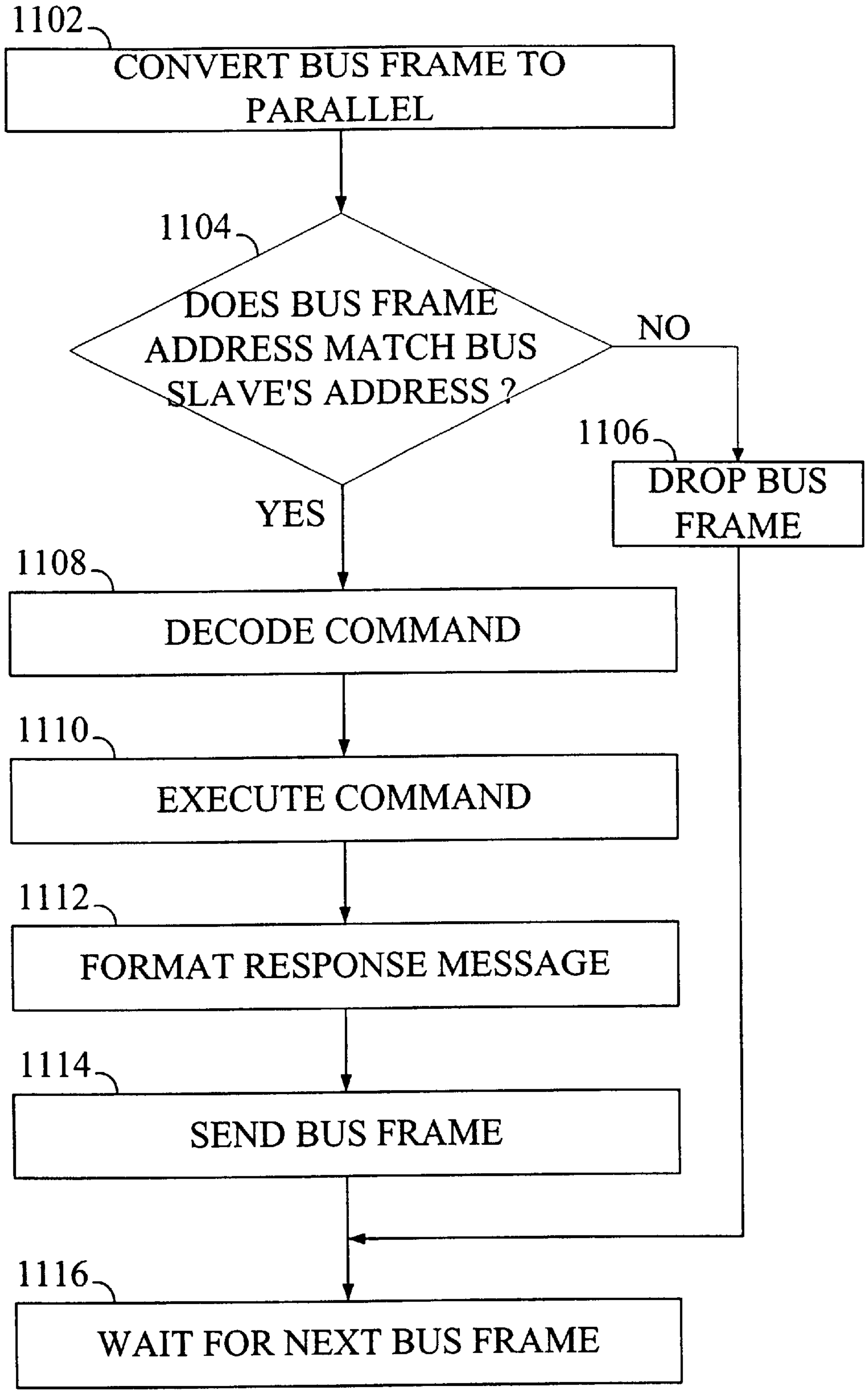
FIG. 11 is a flowchart that describes the operations of each bus slave.

FIG. 11 is a flowchart that describes the operations of each bus slave 110 in greater detail. In step 1102, bus slave 110 converts the received bus frame from serial to parallel form.

Comparing Resource Address to Bus Slave Address

In step 1104, bus slave 110 determines whether the resource address (contained in bus slot 602 or 702, depending upon the message format) matches the bus slave's address. How this is accomplished depends upon whether physical or logical addressing is being used as indicated by the physical/logical address bit (contained in bus slot 602 or 702, depending on the message format). If physical addressing is used, then the resource address is compared to the physical ID of RF device 104. If logical addressing is used, then the resource address is compared to the logical ID table in bus slave 110. If the decoded bit position is programmed with a 1, then the resource address is a valid logical address for the RF device. If the decoded bit position is programmed with a 0, then the resource address is not a valid logical address for the RF device. In a preferred embodiment, a logical addressed message with an address of "111111" indicates a broadcast address recognized by all bus slaves 110 for write commands.

If the resource address in the received bus frame does not match the bus slave's address, then in step 1106 bus slave 110 drops the received bus frame and waits for the next bus frame in step 1116.

In a preferred embodiment, bus slave 110 performs error detection through the use of parity. As described above with respect to FIG. 5, each bus slot 502 contains a parity bit and eight bits of data. The LSB is transmitted first, followed by the MSB and then the parity bit of each bus slot 502. Parity is calculated as odd. The addressed bus slave 110 shall compute odd parity for the 8 bits during each bus slot 502 and compare with the parity sent by bus master 108.

If the addressed bus slave 110 receives the message without errors, bus slave 110 continues processing the message. If bus slave 110 detects a parity error on the resource address (in bus slot 602 or 604, depending upon the message format), then bus slave 110 ceases processing the message and sets an address parity error flag in an RF control bus error register (not shown). If the addressed bus slave 110 detects a parity error on any of the other bus slots, then bus slave 110 ceases processing the message and sets a data parity error flag in the RF control bus error register.

Decode and Execute Command

If the resource address in the received bus frame does match the bus slave's address, then in step 1108 bus slave 110 decodes the command contained in the bus frame. Command codes are provided in bus slot 604 for standard format messages, and in bus slot 704 for variable length messages. As described above, a hexadecimal code is preferably used to uniquely identify a command from one or more available commands. The hexadecimal code can be decoded, for example, by using a look-up table to determine which command corresponds to the hexadecimal code.

In step 1110, bus slave 110 executes the decoded command. As described above, various commands are preferably defined for read and write operations. The specific commands defined for use over RF control bus 106 will vary by application. Some commands will involve only the addressed bus slave 110; other commands will involve the corresponding RF interface 114 and RF device 104.

Slave Response Message Format and Slave Response Bus Frame

Figures 12A, 12B:
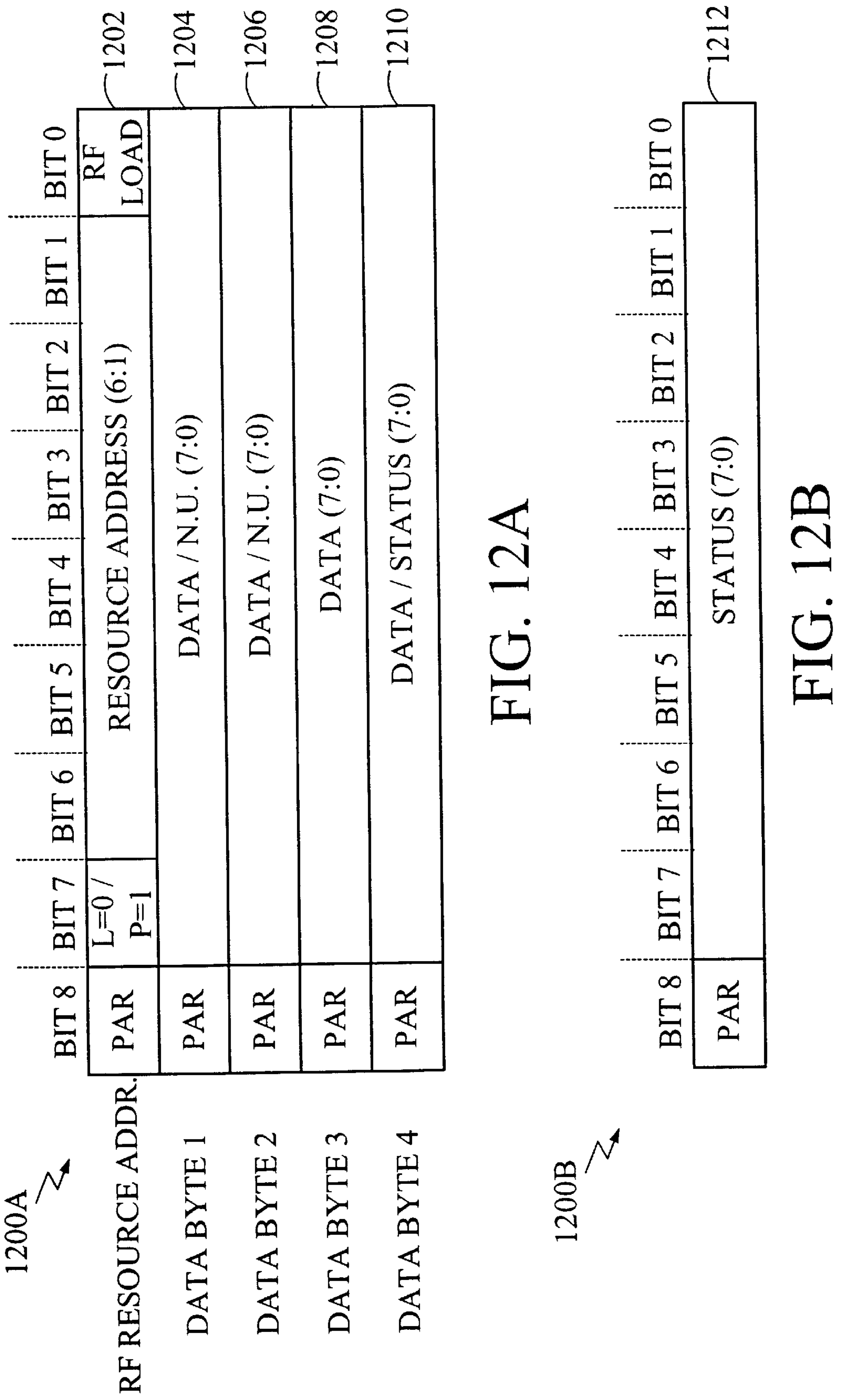
FIG. 12A depicts a first slave response message format.
FIG. 12B depicts a second slave response message format.

In step 1112, bus slave 110 formats a response message to bus master 108 based on the results of the executed command in step 1110. Some commands will require the addressed bus slave 110 to respond with a status message (e.g., a physically addressed write command), a message containing data (e.g., a read command), or nothing at all (e.g., any logically addressed command). Bus master 108 formats this message according to a slave response message format. FIG. 12 depicts two example slave response message formats 1200A and 1200B in greater detail. Slave response message format 1200A is preferably used by the addressed bus slave 110 when responding to data read commands from bus slave 110. Slave response message format 1200B is preferably used by the addressed bus slave 110 when providing status information in response to a command, such as a write command in a preferred embodiment.

Slave response message format 1200A has five bus slots (shown as 1202 through 1210). Each of the bus slots 1202 through 1210 includes a parity bit (labeled PAR) in the bit 8 position. Bus slot 1202 (labeled RF Resource Address) includes a physical/logical address bit, a resource address, and an RF load bit. Bus slot 1202 is the same as bus slot 602 described above with respect to FIG. 6. If the message being sent by the addressed bus slave 110 is in response to a read command, then resource address (6:1) contains the identical resource address value as bus master 108 transmitted to bus slave 110 in bus slot 602 or 702 (i.e., the addressed bus slave's address).

Bus slots 1204 through 1210 (labeled Data Byte 1 through Data Byte 4) contain the data that is read from RF device 104 as the result of a read command. Depending on the type of command that is being executed, one or more of these bus slots can contain status information or might not be used at all.

Slave response message format 1200B has one bus slot 1212 which includes a parity bit (labeled PAR) in the bit 8 position and a status byte (7:0). In a preferred embodiment, status byte (7:0) contains the status byte read from the RF interface's external status bus. An example slave response message is shown in FIGS. 9 and 10 as SRFD_O.

Figure 13:
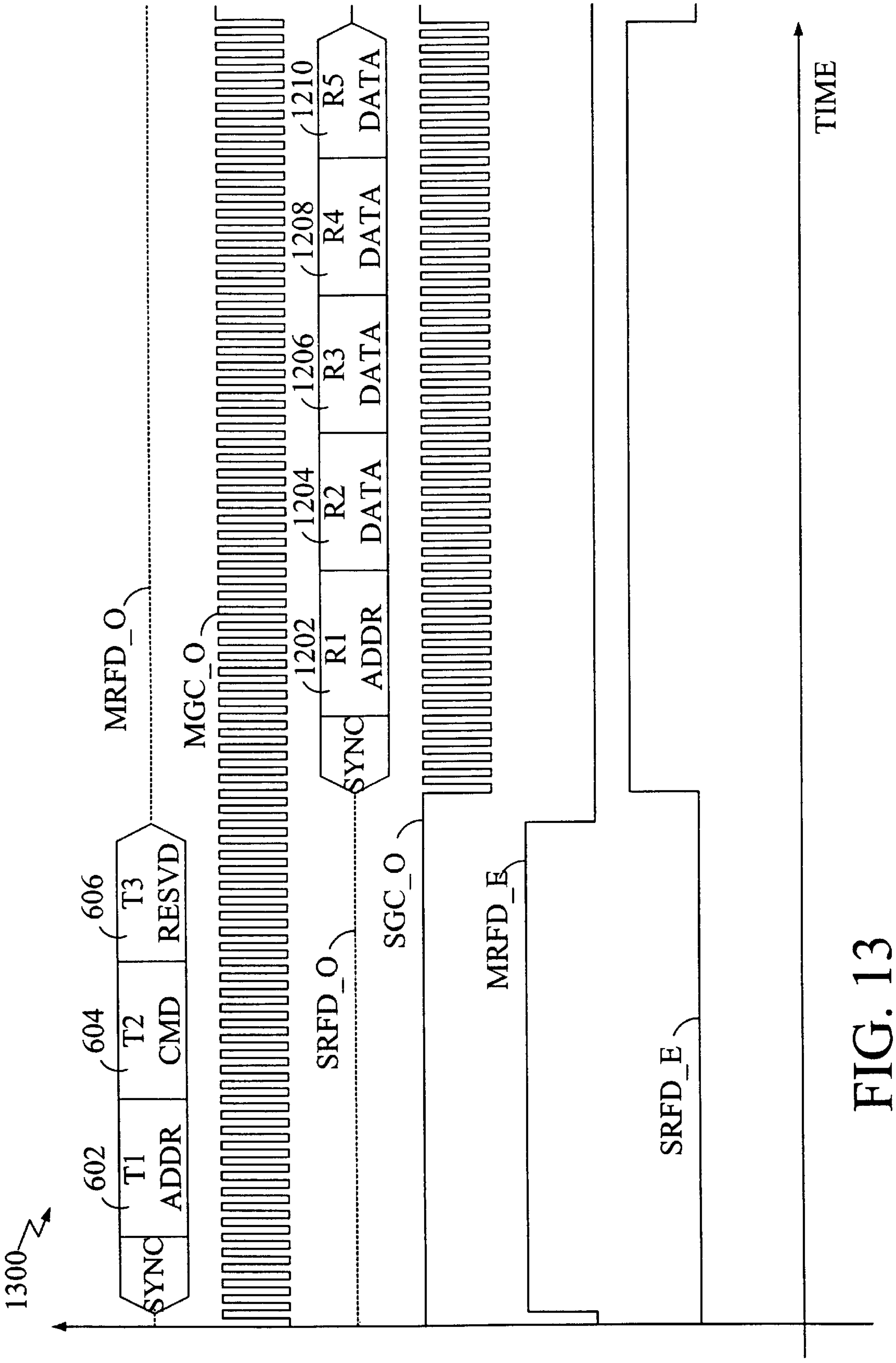
FIG. 13 depicts a slave response bus frame.

In step 1114, bus slave 110 sends a slave response bus frame across RF control bus 106 that includes the slave response message. FIG. 13 depicts a slave response bus frame 1300 in greater detail that includes a slave response message formatted according to slave response message format 1200A. FIG. 13 depicts, for example, bus master 108 sending a read command and bus slave 110 responding with the requested data. Bus master 108 sends the data signal MRFD_O over RFD 120 by enabling the appropriate driver 202 (e.g., driver 202A or 202F) with the enable signal MRFD_E. MRFD_O includes the data synchronization pattern (labeled SYNC), followed by the message formatted according to standard message format 600. In this example, bus slot 604 includes a read command and a register enable that indicates where the data is to be read from. Bus slot 606 is preferably reserved, which allows for additional features to be added depending upon the application.

The addressed bus slave 110 responds with a message SRFD_O over RFD 120 by enabling the appropriate driver 202 (e.g., driver 202C or 202G) with the enable signal SRFD_E. SRFD_O includes the data synchronization pattern (labeled SYNC), followed by the slave response message including bus slots 1202 through 1210. Slave response bus frame 1300 is approximately 775 nS in duration.

In step 1116, having completed processing the received message, bus slave 110 waits to receive the next bus frame from bus master 108 via RF control bus 106.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

While the invention has been particularly shown and described with reference to preferred embodiments thereof, it will be understood by those skilled in the art that various changes in form and details may be made therein without departing from the spirit and scope of the invention.

What is claimed is:

1. A control bus for providing a communication interconnect path between a bus master and one or more bus slaves, wherein the bus master is coupled to a processor and each bus slave is coupled to a Radio Frequency (RF) device that operates without a free-running clock, the control bus comprising:

- a bi-directional data line coupled to the bus master and to the one or more bus slaves;
- a first clock line, coupled to the bus master and to the one or more bus slaves, to be asserted by the bus master when transmitting serial data to or receiving serial data from the one or more bus slaves via said bi-directional data line; and
- a second clock line, coupled to the bus master and to the one or more bus slaves, to be asserted by the one or more bus slaves when transmitting serial data to the bus master via said bi-directional data line.

2. The control bus of claim 1, wherein said bi-directional data line, said first clock line, and said second clock line are Low Voltage Differential Signal (LVDS) paths.

3. A control bus for providing a communication interconnect path between a bus master and one or more bus slaves, wherein the bus master is coupled to a processor and each bus slave is coupled to an RF device that operates without a free-running clock, the control bus comprising:

- a first data line coupled to the bus master and to the one or more bus slaves;

a second data line coupled to the bus master and to the one or more bus slaves;

a first clock line, coupled to the bus master and to the one or more bus slaves, to be asserted by the bus master when transmitting serial data to the one or more bus slaves via said first data line or receiving serial data from the one or more bus slaves via said second data line; and a second clock line, coupled to the bus master and to the one or more bus slaves, to be asserted by the one or more bus slaves when transmitting serial data to the bus master via said second data line.

4. The control bus of claim 3, wherein said first data line, said second data line, said first clock line, and said second clock line are LVDS paths.

5. A system for RF control, comprising:

a processor;

a bus master coupled to said processor;

a bus slave;

an RF device coupled to said bus slave; and an RF control bus, including:

a bi-directional data line coupled to said bus master and to said bus slave, a first clock line, coupled to said bus master and to said bus slave, to be asserted by said bus master when transmitting serial data to or receiving serial data from said bus slave via said bi-directional data line, and a second clock line, coupled to said bus master and to said bus slave, to be asserted by said bus slave when transmitting serial data to said bus master via said bi-directional data line.

6. The system of claim 5, further comprising:

a first First-In/First-Out (FIFO) device, wherein said processor loads a parallel transmit message into said first FIFO device and said bus master retrieves said parallel transmit message;

a second FIFO device, wherein said bus master loads a parallel receive message into said second FIFO device and said processor retrieves said parallel receive message; and a status line coupled between said bus master and said processor.

7. The system of claim 5, wherein said processor sends a parallel transmit message to said bus master, and wherein said bus master converts said parallel transmit message to a serial message format and transmits said message to said bus slave via said RF control bus.

8. The system of claim 7, wherein said bus master transmits a synchronization burst to said bus slave via said data line before transmitting said message to said bus slave.

9. The system of claim 7, wherein said serial message format includes a standard message format and a variable length message format.

10. The system of claim 7, wherein said transmitted message includes a resource address and a command, said bus slave includes a physical address, and wherein said bus slave determines whether said resource address matches said physical address, and if so, responds by sending a slave response message to said bus master and executes said command.

11. The system of claim 10, wherein said command comprises a write command and said slave response message comprises a status message.

12. The system of claim 7, wherein said transmitted message includes a resource address and a command, said bus slave includes a logical address, and wherein said bus slave determines whether said resource address matches said logical address, and if so, executes said command.

13. The system of claim 5, further comprising:

a first driver coupled between said bus master and said bi-directional data line;

a first receiver coupled between said bus master and said bi-directional data line;

a second driver coupled between said bus master and said first clock line;

a second receiver coupled between said bus master and said second clock line;

a third driver coupled between said bus slave and said bi-directional data line;

a third receiver coupled between said bus slave and said bi-directional data line;

a fourth receiver coupled between said bus slave and said first clock line; and a fourth driver coupled between said bus slave and said second clock line.

14. The system of claim 13, wherein said bi-directional data line, said first clock line, and said second clock line are differential signal paths, wherein said first, second, third, and fourth drivers are LVDS drivers, and wherein said first, second, third, and fourth receivers are LVDS receivers.

15. The system of claim 5, wherein said RF device operates without a free-running clock.

16. A method of controlling an RF device, wherein an RF control bus interconnects a bus master and a bus slave, wherein the bus slave is coupled to the RF device and the bus master is coupled to a processor, and wherein the RF control bus includes a data line, a first clock line, and a second clock line, comprising the steps of:

(a) sending a parallel transmit message from the processor to the bus master;

(b) converting the parallel transmit message into a serial data stream;

(c) formatting said serial data stream according to a serial message format, thereby creating a formatted message;

(d) sending a synchronization burst to the bus slave via the data line;

(e) asserting the first clock line while sending said formatted message from the bus master to the bus slave via the data line; and (f) determining whether the bus slave is the intended recipient of said formatted message, and if so, formatting a status message and asserting the first and second clock lines while sending said status message from the bus slave to the bus master via the data line.

17. The method of claim 16, wherein the first and second clock lines are quiet during said synchronization burst.

* * * * *